Feb. 20, 1962  W. B. G. CRAN  3,021,966
STACKING OF FLAT ARTICLES
Filed Oct. 14, 1959  4 Sheets-Sheet 2

Inventor
W. B. G. Cran
By Glascock Downing Seebold
Attys

Feb. 20, 1962 W. B. G. CRAN 3,021,966
STACKING OF FLAT ARTICLES
Filed Oct. 14, 1959 4 Sheets-Sheet 3

Inventor
W.B.G. Cran
By Mason Downing Seebold
Attys

3,021,966
STACKING OF FLAT ARTICLES
William Broadbent Gordon Cran, Huddersfield, England, assignor to Thomas Broadbent & Sons Limited, Huddersfield, England, a company of Great Britain
Filed Oct. 14, 1959, Ser. No. 846,321
Claims priority, application Great Britain Oct. 23, 1958
2 Claims. (Cl. 214—6)

This invention relates to the stacking of flat articles of a semi-rigid nature such as laundry flatwork, and has for its object to provide improved simplified means for stacking such articles which have a high output capacity.

The invention consists in a machine for stacking flat articles comprising a conveyor consisting of a number of spaced tapes for delivering the articles successively to the predetermined stacking position, a horizontally movable member or members each comprising a number of spaced prongs on a carriage adapted to be moved back and forth at a level above the conveyor, an elevating member disposed normally beneath the conveyor and comprising a plurality of spaced parts adapted to be raised between the conveyor tapes to lift any article on the conveyor to above the latter, a motor operating a single revolution clutch, means to initiate the operation of said clutch under the control of an article as it travels towards the stacking position, the horizontal member or members moving continuously during the timed cycle of the single revolution switch and at the beginning of such timed cycle moving beyond the conveyor and an article thereon and depositing any articles which may be on the horizontal member or members on the said article on the conveyor, the elevating member being then raised due to the action of the single revolution switch to lift the article or articles from the conveyor whilst the horizontal member or members move further from and then back into a position above the conveyor but below the elevating member, the latter then lowering its article or articles on to the horizontal member or members and passing to beneath the conveyor when the timed cycle is completed.

Referring to the accompanying explanatory drawings:
FIGURE 1 is a general elevational view partly in section and FIGURE 2 a plan view of a stacking machine constructed in one convenient form in accordance with this invention.
FIGURES 3 to 8 are diagrams indicating the series of operations involved in the stacking cycle.
FIGURES 9 to 14 are diagrams indicating the series of operations in a stacking cycle with a modified arrangement of horizontal member.

The machine incorporates two side plates or members 1 between which extend and are secured various cross members carrying operative components of the machine so as to produce a rigid structure.

There is a main conveyor comprising a number of spaced tapes 2 which pass around idler rollers 3 and a drive roller 4, the latter being driven continuously by a chain 5 from an electric motor 6. In FIGURE 2, the tapes have been shortened at their right hand ends in order to avoid confusion with the other parts which come above and below the tapes and are in line with the gaps between the tapes.

A horizontal member consisting of spaced prongs 7 secured together by a cross member 8 is adapted to have horizontal movement to bring it over the conveyor 2 or to withdraw it to the right of FIGURE 1 clear of the articles which are carried into the machine on the main conveyor 2. The cross member 8 has bushes 9 at its ends which can slide along guide rods 10. One end of the carriage 8 is pivotally attached to one throw of a double throw crank 11 carried in bearings 12 secured to a bracket 13 and having a sprocket wheel 14 thereon driven by a chain 15.

Beneath the main conveyor 2 is a vertical elevator comprising a number of plates 16 held together at their base by a frame 17 attached to a rod 18 adapted to move up and down freely in a bush 19 in a fixed bracket 20. The right hand edges of the plates 16 move vertically in fixed guide rods 32. In the "down" position shown, the frame 17 rests on a rubber ring 21 which acts as a cushion and the lower end of the rod 18 is in contact with a cam 22 carried in a bracket 23 and turned by a chain 24.

Both the chains 15 and 24 are driven by sprocket wheels secured to the driven side of a single revolution clutch 25, the driving side being driven from the motor 6 by the chain 27. The single revolution clutch is of known standard type which when operated by a lever as 28 causes the driving and driven members to engage and the driven member then makes one complete revolution after which it is disengaged.

The lever 28 is operated by a solenoid 29 whose energisation is controlled by a micro-switch 30 through a time delay (not shown), the microswitch being operated by a drop arm 31 which hangs down between tapes of the main conveyor 2 and is engaged by an article on and moving forward with the said conveyor.

Each article which is to be stacked on the prongs 7 is fed on to the main conveyor at its left hand end and as it travels with the conveyor, its leading edge first contacts the drop arm 31 and so actuates the micro-switch 30. The time delay (not shown) associated with the micro switch allows the article to travel with the main conveyor until its leading edge is approximately 2 to 3 inches from the vertical guides 32. At this point, solenoid 29 is energised by current from the micro switch 30 and time delay (not shown) associated therewith which causes the lever 29 to bring the single revolution clutch 25 into operation, with the result that the chains 15 and 24 drive the crank 11 and cam 22 respectively, each through one complete revolution.

During the first quarter revolution of the clutch, the chain 15 and double throw crank 11 move the cross member 8 and the prongs 7 attached thereto to the right until the prongs are clear of the conveyor 2 and have passed through the vertical guides 32 which cause any articles which may be on the prongs to be deposited on to the new article on the conveyor 2. Due to the concentricity of the initial portion of the cam 22, the parts 18, 17 and 16 do not move.

During the next half revolution of the clutch the prongs 7 travel to the end of their stroke to the right in FIGURE 1 and part way back again but are still clear of the conveyor 2. The form of the cam 22 causes the vertical plates 16 to be raised to their highest position and raise any articles on the conveyor clear of the latter.

During the final quarter revolution of the clutch 25, the horizontal prongs 7 are brought beneath the article carried by the vertical plates 16. The action of the double throw crank 11 ensures that during the final 10 to 15° of its rotation in each cycle, the horizontal movement of the prongs 7 is very small. The cam 22 is so shaped that for approximately 75 to 80° of the final 90° of rotation, there is no movement of the plates 16 which are retained in their highest position clear of the prongs 7. During the final 10° to 15° of the cam cycle, the cam form is nearly radial so that the parts 18, 17 and 16 drop sharply, leaving the article or articles on the prongs 7 where they remain till the next cycle.

As already stated, the final movement of the prongs 7 is very small so that the leading edges of the articles remain substantially against the vertical guide rods 32, which helps to maintain a straight vertical stack as further articles are added.

The microswitch 30 and drop arm 31 can be adjusted along the support bar 33 so that the overall timing of the leading edge of the article when the latter is lifted by the vertical plates 16 can be set to cause said leading edge to be approximately in contact with the vertical guides 32.

If desired the horizontal members 7 may be moved at right angles to the conveyor 2 instead of in the direction of its travel, in which case the vertical plates 16 will be suitably slotted to clear the prongs of the horizontal member.

Figure 5:
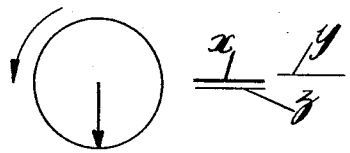

In the FIGURE 5 position, the vertical plates $z$ have moved up to the underside of the article.

Figure 6:
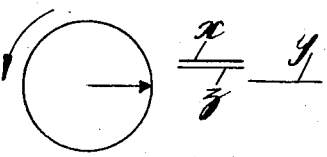

In the FIGURE 6 position, the vertical plates $z$ have raised the article to above the level of the horizontal prongs $y$.

Figure 7:
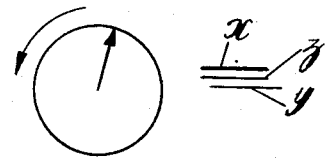

In the FIGURE 7 position, the horizontally moving prongs $y$ have moved to beneath the plates $z$.

Figure 8:
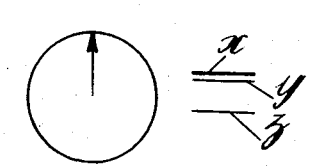

In FIGURE 8, the vertically moving plates have moved clear of the article $x$ which has dropped on to the prongs $y$.

Figure 1:
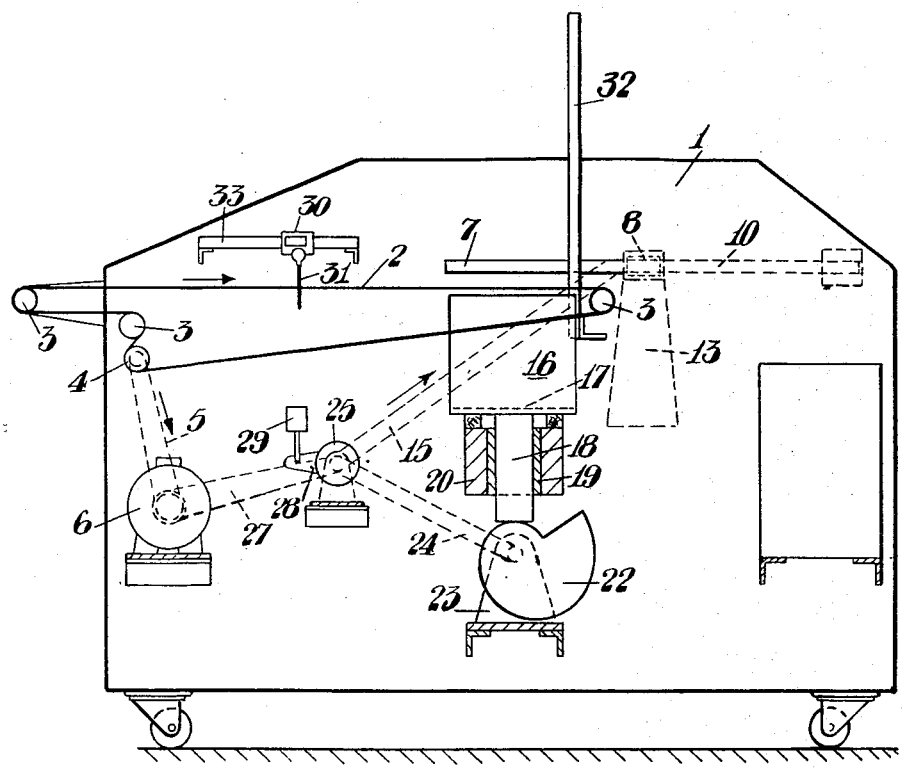
Figure 2:
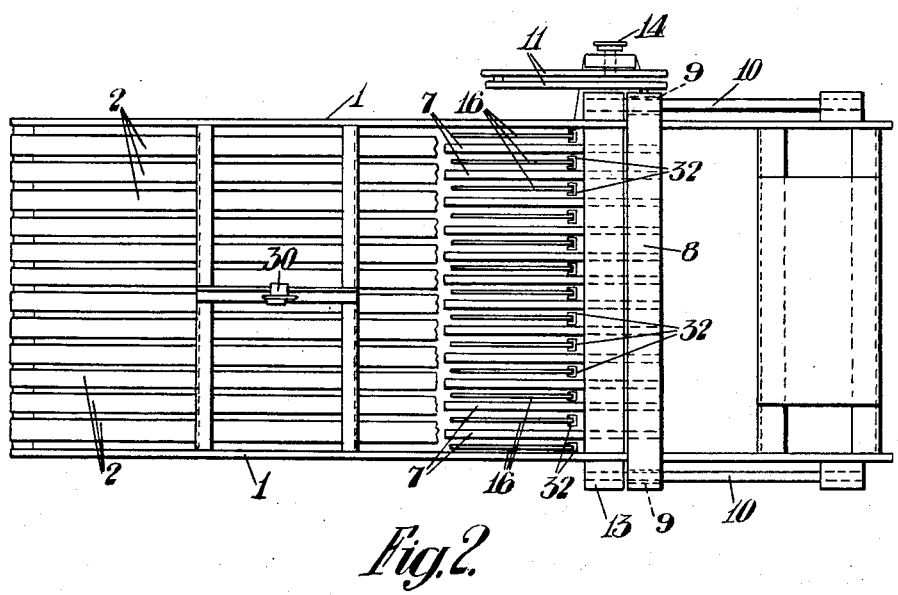
Figure 3:
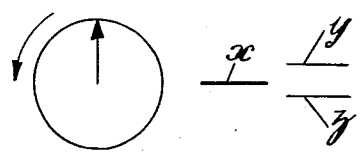
FIGURE 3 shows diagrammatically the positions of the article $x$ about to be stacked, of the horizontally moving prongs $y$ and of the vertically moving plates $z$ at the commencement of a cycle.
Figure 4:
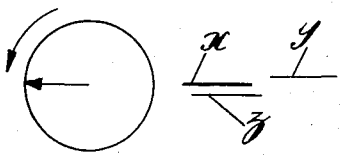
FIGURE 4 shows the positions after a quarter cycle of movement. The prongs $y$ are clear of the article $x$ which has now moved to a position above the plates $z$.

The cycle is now repeated with a fresh article moved into the FIGURE 1 position and the articles are gradually stacked on the horizontal prongs $y$. In FIGURES 3–8, the position of the main conveyor has not been taken into account, as the cycle of operations only commences when a new article arrives near to its final stacking position.

The stacking cycle of our improved machine can be completed in one half a second making it possible to stack 60 articles a minute, taking into account the time between cycles whilst a new article is being fed by the conveyor to the stacking position.

By arranging that the forks 7 are moved continuously, we avoid the problems of timing as the necessary continuous movement occupies the complete cycle which as before stated takes approximately one half a second.

Figure 9:
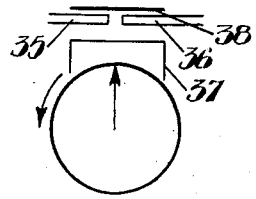
Figure 10:
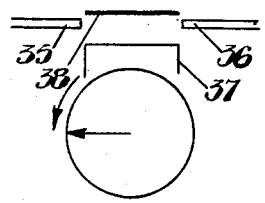
Figure 11:
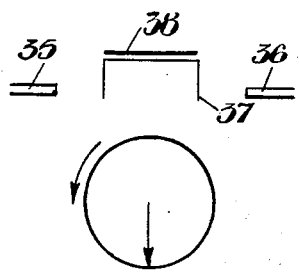
Figure 12:
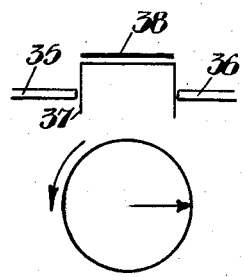
Figure 13:
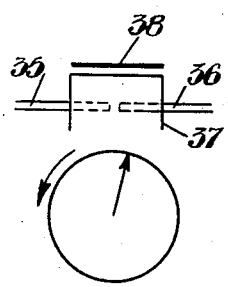
Figure 14:
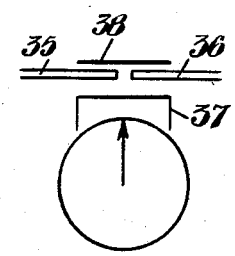

Two sets of horizontally movable members, moving in opposite directions may be employed to deal with larger articles. Such an arrangement is shown diagrammatically along with its stacking cycle in FIGURES 9 to 14. In FIGURE 9 the two horizontally movable members 35 and 36 are shown in their "in" positions above the vertically movable member 31. There is an article 38 on the members 35, 36. In FIGURE 10, the members 35, 36 haved moved apart and the article 38 has dropped on to the conveyor (not shown) which has the member 37 beneath it. In FIGURE 11, the member 37 has been raised and has lifted the article 38 off the conveyor. In FIGURE 12, the horizontally movable members 35, 36 have commenced to move towards one another and in FIGURE 13, they are beneath the member 37. In FIGURE 14, the member 37 has moved downwards and deposited the article 38 on the members 35 and 36. The articles build up on the members 35 and 36 at the end of each cycle.

What I claim is:

1. A machine for stacking semi-rigid flat articles comprising a conveyor having a plurality of spaced gaps in its width for delivering the articles successively to the predetermined stacking position, a movable elevating member comprising a series of parts spaced to conform to the spacing of the gaps in the width of the conveyor, a stop member comprising a plurality of vertically extending laterally spaced parts in a plane transverse to the conveyor and fixed at a location adjacent to the stacking position, a horizontally movable support member including a plurality of prongs projecting in a horizontal plane above the conveyor and spaced from each other transversely of the conveyor to conform to the spacing between the parts of the elevating and stop members, means for moving the support member to alternately move the prongs in one direction through the parts of the stop member to a location above the stacking position and in a reverse direction away from the stacking position to limit the movement of the flat articles being carried by the prongs by engagement with the stop member so that they do not pass beyond the stacking position, a motor for operating a single revolution clutch, means to initiate operation of said clutch under the control of an article travelling along the conveyor to the stacking position, means operated by the clutch through a timed cycle for moving the support in the reverse direction to release any article on the prongs so that it drops on to the article on the conveyor, to raise the elevating member through the gaps in the conveyor to lift any article on the conveyor above the horizontal plane of the prongs, to move the prongs in the one direction into the stacking position and between the respective parts of the elevating member when in raised position and to thereafter lower the elevating member and stacked articles onto the support member in timed relation within the cycle.

2. A machine as claimed in claim 1 in which the means operated by the single revolution clutch includes a cam to operate the elevating member, the said cam being shaped to delay the initial movement of said elevating member until the horizontal member has moved clear of the stacking position above the conveyor.

References Cited in the file of this patent

UNITED STATES PATENTS

| | | |
|---|---|---|
| 773,318 | Gay | Oct. 25, 1904 |
| 823,051 | Keyes | June 12, 1906 |
| 2,069,926 | Read | Feb. 9, 1937 |
| 2,414,059 | Powers | Jan. 7, 1947 |
| 2,648,181 | Dalton | Aug. 11, 1953 |
| 2,768,489 | Brown et al. | Oct. 30, 1956 |
| 2,904,941 | Midnight | Sept. 22, 1959 |
| 2,924,051 | More | Feb. 9, 1960 |
| 2,937,482 | Lazott et al. | May 24, 1960 |
| 2,949,118 | Long | Aug. 16, 1960 |